(12) United States Patent
Kim

(10) Patent No.: US 7,520,486 B2
(45) Date of Patent: Apr. 21, 2009

(54) DUAL ISOLATED HYDRAULIC ENGINE MOUNT

(75) Inventor: Tae Sup Kim, Busan-si (KR)

(73) Assignee: DTR Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 11/610,251

(22) Filed: Dec. 13, 2006

(65) Prior Publication Data

US 2008/0116350 A1    May 22, 2008

(30) Foreign Application Priority Data

Nov. 22, 2006    (KR) .................... 10-2006-0115634

(51) Int. Cl.
*F16M 13/00*    (2006.01)
(52) U.S. Cl. .................. 248/636; 248/562; 248/566; 248/630; 248/631; 267/140.13
(58) Field of Classification Search ............... 248/562, 248/566, 630, 631, 636; 267/140.13
See application file for complete search history.

(56) References Cited

U.S. PATENT DOCUMENTS

| | | | | | |
|---|---|---|---|---|---|
| 2,555,347 | A | * | 6/1951 | Lee ..................... | 267/140.13 |
| 4,216,695 | A | * | 8/1980 | Hoshino ................ | 84/421 |
| 4,690,388 | A | * | 9/1987 | Harrison ............... | 267/35 |
| 4,699,348 | A | * | 10/1987 | Freudenberg ........... | 248/550 |
| 4,706,947 | A | * | 11/1987 | Makibayashi et al. .. | 267/140.13 |
| 4,840,358 | A | * | 6/1989 | Hoying et al. .......... | 267/140.14 |
| 4,856,750 | A | * | 8/1989 | Le Fol ................. | 248/562 |
| 4,881,724 | A | * | 11/1989 | Bausch ................ | 267/64.23 |
| 4,923,158 | A | * | 5/1990 | Saisho ................ | 248/188.8 |
| 5,009,404 | A | * | 4/1991 | Hirazawa .............. | 267/140.13 |
| 5,127,636 | A | * | 7/1992 | Spaltofski ............. | 267/140.13 |
| 5,348,266 | A | * | 9/1994 | Gertel et al. ............ | 248/562 |
| 5,427,347 | A | * | 6/1995 | Swanson et al. ........ | 267/140.14 |
| 5,799,930 | A | * | 9/1998 | Willett ................ | 267/141.4 |
| 5,820,113 | A | * | 10/1998 | Laughlin .............. | 267/140.15 |
| 6,000,670 | A | * | 12/1999 | Okamoto .............. | 248/562 |
| 6,003,897 | A | * | 12/1999 | Dostert et al. .......... | 280/781 |
| 6,095,481 | A | * | 8/2000 | Norkus et al. .......... | 248/560 |
| 6,254,069 | B1 | * | 7/2001 | Muramatsu et al. .... | 267/140.14 |
| 6,357,717 | B1 | * | 3/2002 | Kennard, IV ........... | 248/638 |
| 6,361,096 | B2 | * | 3/2002 | Kim ................... | 296/35.1 |
| 6,634,629 | B1 | * | 10/2003 | Lee .................... | 267/140.13 |
| 7,070,157 | B2 | * | 7/2006 | Huprikar et al. ........ | 248/636 |
| 2001/0017341 | A1 | * | 8/2001 | Gennesseaux .......... | 248/550 |
| 2005/0073166 | A1 | * | 4/2005 | Synder ................ | 296/35.1 |
| 2005/0279910 | A1 | * | 12/2005 | Huprikar et al. ........ | 248/636 |

* cited by examiner

*Primary Examiner*—J. Allen Shriver, II
*Assistant Examiner*—Michael McDuffie
(74) *Attorney, Agent, or Firm*—Roberts Mlotkowski Safran & Cole, P.C.; Thomas W. Cole

(57) ABSTRACT

Disclosed is a hydraulic engine mount having a fastener which protrudes outside from a mount body and is inserted into a fastener insert hole formed in a support structure such as a vehicle frame or the like and then fixed thereto by means of a fastener member. The engine mount comprises a first elastic pad having a first hole through which the fastener can pass and a second elastic pad having a second hole through which the fastener can pass. When installed in the support structure, the first elastic pad is disposed between the support structure and the mount body and the second elastic pad is disposed between the support structure and the fastener member.

5 Claims, 4 Drawing Sheets

DUAL ISOLATED HYDRAULIC ENGINE MOUNT

BACKGROUND OF THE INVENTION

1. Field of the Invention

The present invention relates to an engine mount, more particularly to an engine mount which is installed between a powertrain such as an engine or transmission of a vehicle and the vehicle structure such as a sub-frame where the powertrain is installed and supported, to thereby inhibit vehicle vibration from being transmitted between the powertrain and the vehicle structure, due to road conditions, engine operation, power transmission and the like.

2. Background of the Related Art

In general, a hydraulic engine mount provides sufficient damping to the rigid body mode control of the engine during the operation of a vehicle and at the same time can isolate vibration from the engine, thereby providing an excellent vibration isolation performance, as compared to a rubber engine mount. Thus, luxurious vehicles employ such hydraulic engine mounts.

FIG. 1 shows a conventional hydraulic engine mount 10. This engine mount 10 includes a mount body having a rubber isolator 11 filled with liquid, a lower cover 12 installed at the lower portion of the rubber isolator 11 and a metallic inserter 13 installed at the top face of the rubber isolator 11.

The metallic inserter 13 is provided with an upper fastener 15 protruded upwardly so as to be inserted into and fixed to a hole formed in the bracket of an engine or transmission or the like. Installed in the bottom face of the lower cover 12 is a lower fastener protruded downwardly so as to be inserted into and fixed to a hole 22 formed in a vehicle frame 20 or the like. A guide pin 17 is installed in a way to protrude downwardly spaced apart from the lower fastener 16, thereby preventing rotation of the engine mount 10 installed in the vehicle frame 20 and the like.

As shown in FIG. 1, the conventional hydraulic engine mount 10 is fixedly mounted on the vehicle frame 20 in such a manner that the lower fastener 16 and the guide pin 17 are inserted into the holes 22 and 24 respectively and then a nut 18 is tightened into the lower fastener 16 from the bottom face of the vehicle frame 20. Here, the lower cover 12 is directly contacted with the vehicle frame 20.

The conventional hydraulic engine mount 10 of FIG. 1 can provide sufficient damping to the rigid body mode control of an engine during operation of a vehicle and also provides an advantage of isolating vibration from the engine. However, this can not avoid structural resonance at a high-frequency range. Thus, in case where the conventional hydraulic engine mount 10 is applied to a high-power diesel engine or the like, which produces vibration at a high-frequency range, it produces significant noises inside of the vehicle disadvantageously.

SUMMARY OF THE INVENTION

It is an object of the present invention to provide an engine mount, which have good vibration isolation effects at a high-frequency range to reduce noises inside of a vehicle, while maintaining advantages of conventional hydraulic engine mounts.

Another object of the invention is to provide a hydraulic engine mount, which can be easily applied regardless of types of engine mounts, without necessity of modifying conventional hydraulic engine mounts.

A further object of the invention is to provide a hydraulic engine mount, which can improve vibration isolation effects at a high-frequency range to reduce noises inside of a vehicle.

In order to accomplish the above objects, according to an aspect of the invention, there is provided a hydraulic engine mount having a fastener which is installed so as to protrude outside from a mount body and inserted into a fastener insert hole formed in a support structure such as a vehicle frame or the like and then fixed thereto by means of a fastener member. The engine mount comprises: a first elastic pad having a first hole through which the fastener can pass, the first elastic pad being disposed between the support structure and the mount body when installed in the support structure; and a second elastic pad having a second hole through which the fastener can pass, the second elastic pad being disposed between the support structure and the fastener member when installed in the support structure.

In an embodiment, the hydraulic engine mount may further comprise a guide pin installed in the mount body in a way to be spaced apart from and in parallel with the fastener, the guide pin being inserted into a guide pin insert hole formed in the support structure to thereby prevent rotation of the mount body, and the first elastic pad further having a third hole formed through which the guide pin can pass.

In an embodiment, the first elastic pad includes a tube member extended from around the third hole in same direction as the guide pin so as to surround the guide pin, the tube member being inserted into the guide pin insert hole to thereby prevent the guide pin from contacting directly the support structure.

In an embodiment, the hydraulic engine mount may further comprise a compression restrictor member, which includes a flange disposed between the second elastic pad and the fastener member and having a fourth hole through which the fastener can pass, and a compression restrictor portion passing through the fastener insert hole from the flange around the fourth hole and extending towards the first elastic pad along outer circumferential face of the fastener, the compression restrictor portion being configured such that the distance to the mount body can be adjusted depending upon compression level of the first and second elastic pad and, if the first and second elastic pads are compressed beyond a pre-determined level, the compression restrictor portion contacts the mount body to prevent the first and second elastic pads from being further compressed.

Preferably, the first and second elastic pad is formed of rubber.

In an embodiment, a step is formed along inner circumferential face of the second hole of the second elastic pad and towards the second elastic pad.

BRIEF DESCRIPTION OF THE DRAWINGS

The above and other objects, features and advantages of the present invention will be apparent from the following detailed description of the preferred embodiments of the invention, in conjunction with the accompanying drawings, in which.

DETAILED DESCRIPTION OF THE PREFERRED EMBODIMENT

Hereafter, exemplary embodiments of the invention will be described, with reference to the accompanying drawings.

Figure 2:
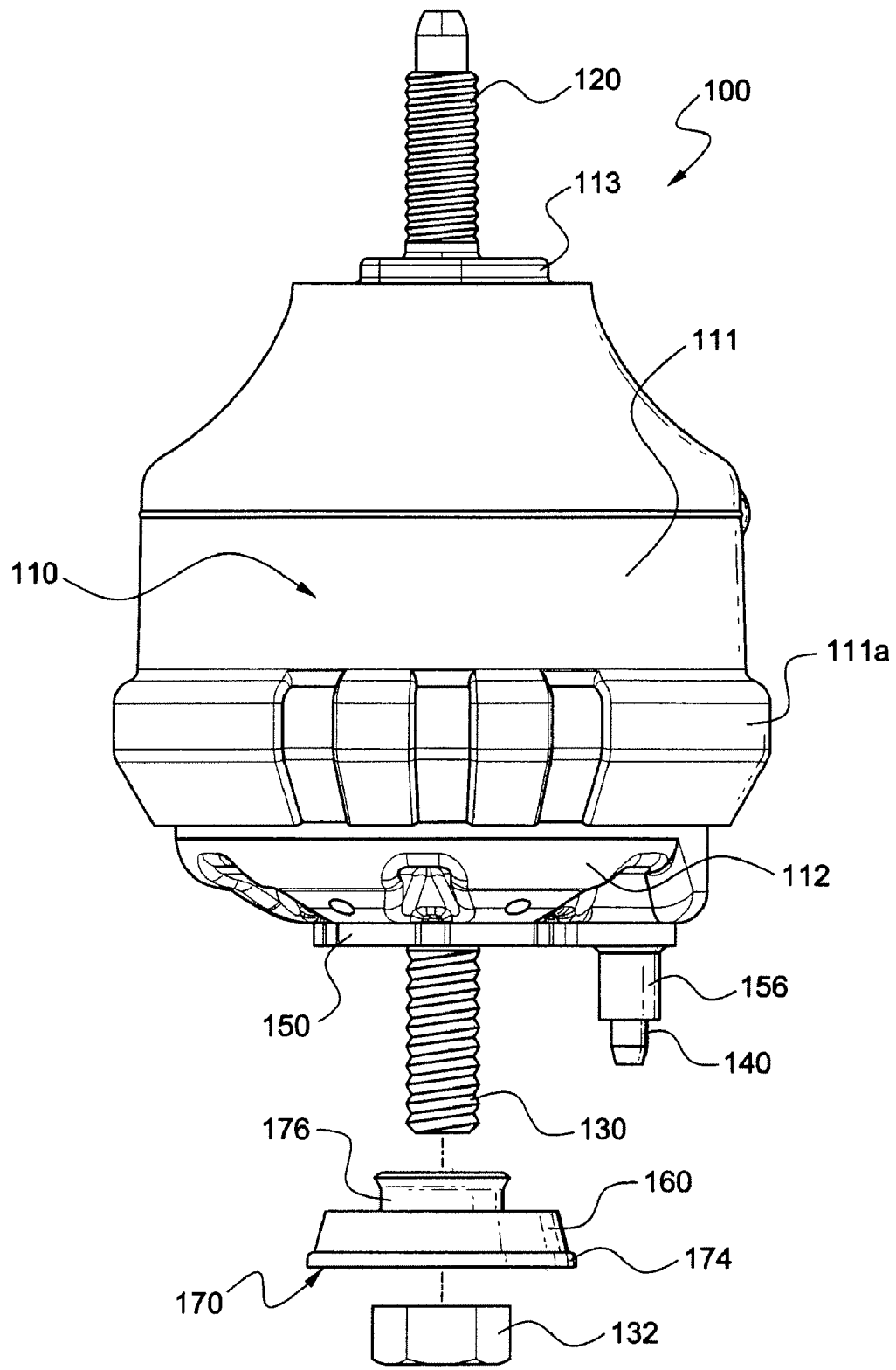
FIG. 2 is an exploded elevation view of a hydraulic engine mount according to an embodiment of the invention.

FIG. 2 shows a hydraulic engine mount 100 according to an embodiment of the invention. The hydraulic engine mount 100 includes a mount body 110. The mount body 110 includes a rubber isolator 111 filled with liquid, a lower cover 112 installed at the lower side of the rubber isolator 111, and a metallic inserter 113 installed on the top face of the rubber isolator 111. The lower cover 112 is made typically of a metallic material such as structural steels (KS specification SAPH 440). An auxiliary means 111a is provided at upper side of the lower cover 112 for receiving the lower portion of the rubber isolator 111 to maintain the shape thereof.

The metallic inserter 113 is installed on top face of the rubber isolator 111. The metallic inserter 113 is made of aluminum or the like having a light weight. The metallic inserter 113 is inserted into a die when forming the rubber isolator 111, to thereby become integrated with the rubber isolator 111. Alternatively, the aluminum may be pre-heated (up to about 150~160° C.) and then a vulcanization bonding is performed to provide integration between the metallic inserter 113 and the rubber isolator 111.

The above mount body 110 functions to shield or isolate most of vibrations, which may be transmitted between an engine and the vehicle frame 20, excepting for some high-frequency vibrations. The construction of the mount body 110 is well-known and may employ those of various hydraulic engine mounts, and thus details thereon will not be explained here.

The metallic inserter 113 is provided with an upper fastener 120 protruded upwardly. The upper fastener 120 is inserted into a hole formed in the bracket of an engine or transmission or the like and fixed thereto. The upper fastener 120 may adopt a bolt.

As shown in the figures, a lower fastener 130 is installed in the bottom face of the lower cover 112 in such a way to protrude downwardly. This lower fastener 130 is configured to be inserted into a fastener insert hole 22 and fixed thereto and may be formed of a bolt.

The lower cover 112 is provided with a guide pin 140 formed in a way to protrude downwardly spaced apart from the lower fastener 130. This guide pin 140 guides mounting-orientation when installing the engine mount 100. In addition, when the engine mount 100 is mounted on a vehicle frame 20 or the like, the guide pin 140 is inserted into a pin insert hole 24 formed in the vehicle frame 20 and so on to prevent rotation of the engine mount 100.

Figure 3:
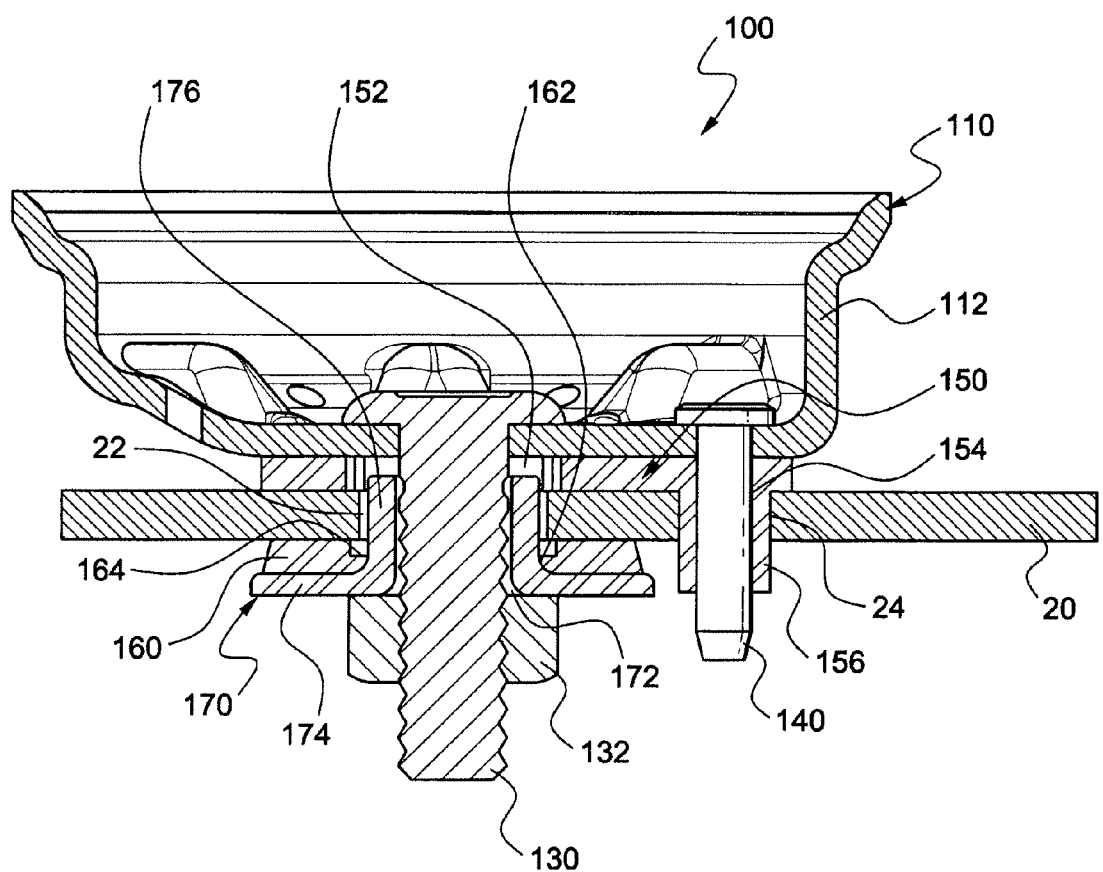
FIG. 3 is a partially enlarged sectional view of the hydraulic engine mount of the invention mounted on a vehicle frame.

As shown in FIGS. 2 and 3, the hydraulic engine mount 100 of the invention includes a first elastic pad 150 disposed at the bottom face of the lower cover 112. Preferably, the first elastic pad is made of rubber. This first elastic pad 150 is provided with a first hole 152 and a second hole 154 formed spaced apart from each other such that the lower fastener 130 and the guide pin 140 can be inserted thereinto respectively. A tube member 156 is formed around the second hole 154 in a way to extend downwardly while surrounding the guide pin 140, and be inserted into a pin insert hole 24 formed in the vehicle frame 20. The tube member 156 functions to prevent the guide pin 140 (inserted into the pin insert hole 24) from contacting directly the vehicle frame 20, which is a mount support structure. In this way, a shock can be buffered, which may be caused between the guide pin 140 and the vehicle frame 20. In addition, noises can be avoided, which may be produced by metallic friction. Such first elastic pad 150 is disposed between a vehicle frame 20 and the mount body 110 when it is mounted on a support structure such as the vehicle frame 20. This first elastic pad 150 functions to primarily shield or isolate high-frequency vibrations being transmitted among power-train components such as a vehicle frame 20 and engine and the like, thereby reducing noises.

The hydraulic engine mount 100 of the invention further includes a second elastic pad 160 disposed between a support structure such as the vehicle frame 20 and a fastener member 132, which is combined with the lower fastener 130 and pulls the lower fastener 130 downwardly. The second elastic pad 160 is provided with a third hole 162 through which the lower fastener passes. Preferably, the second elastic pad 160 is made of rubber. This second elastic pad 160 functions to secondarily shield or isolate high-frequency vibrations being transmitted among power-train components such as a vehicle frame and engine and so on, thereby reducing noises. The second elastic pad 160 is provided at its upper side with a step 164 formed along the third hole 162. This step 164 functions to more resiliently support a compression restrictor 170, which will be explained hereafter. The outer peripheral face of the second elastic pad 160 is inclined inwardly toward the vehicle frame 20. This inclination also functions to support the compression restrictor 170 in more stable and resilient way.

The hydraulic engine mount 100 of the invention further includes a compression restrictor 170. The compression restrictor member 170 includes a flange 174 having a fourth hole 172 and disposed between the second elastic pad 160 and the fastener member 132, and a compression restrictor portion 176 inserted into the fastener insert hole 22 and disposed between the lower fastener 130 and the vehicle frame 20.

The compression restrictor portion 176 passes through the fastener insert hole 22 from the flange 174 around the fourth hole 172 and is extended towards the first elastic pad 150 along the outer circumferential face of the lower fastener 130. The compression restrictor portion 176 is configured such that the distance to the mount body is adjusted depending upon compression level of the first and second elastic pads 150 and 160. In this manner, the compression restrictor portion acts to limit the compression of the elastic pads 150 and 160 to a pre-determined level. That is, if the first and second elastic pads 150 and 160 are compressed beyond the pre-determined level, the end of the compression restrictor portion 176 contacts the lower cover 112 of the mount body 110, not allowing the elastic pads 150 and 160 to be further compressed.

As described above, the hydraulic engine mount may be installed upside down in some circumstances. In this case, it can be mounted on the bracket of an engine or transmission, instead of a vehicle frame 20, as shown in FIG. 3.

Figure 1:
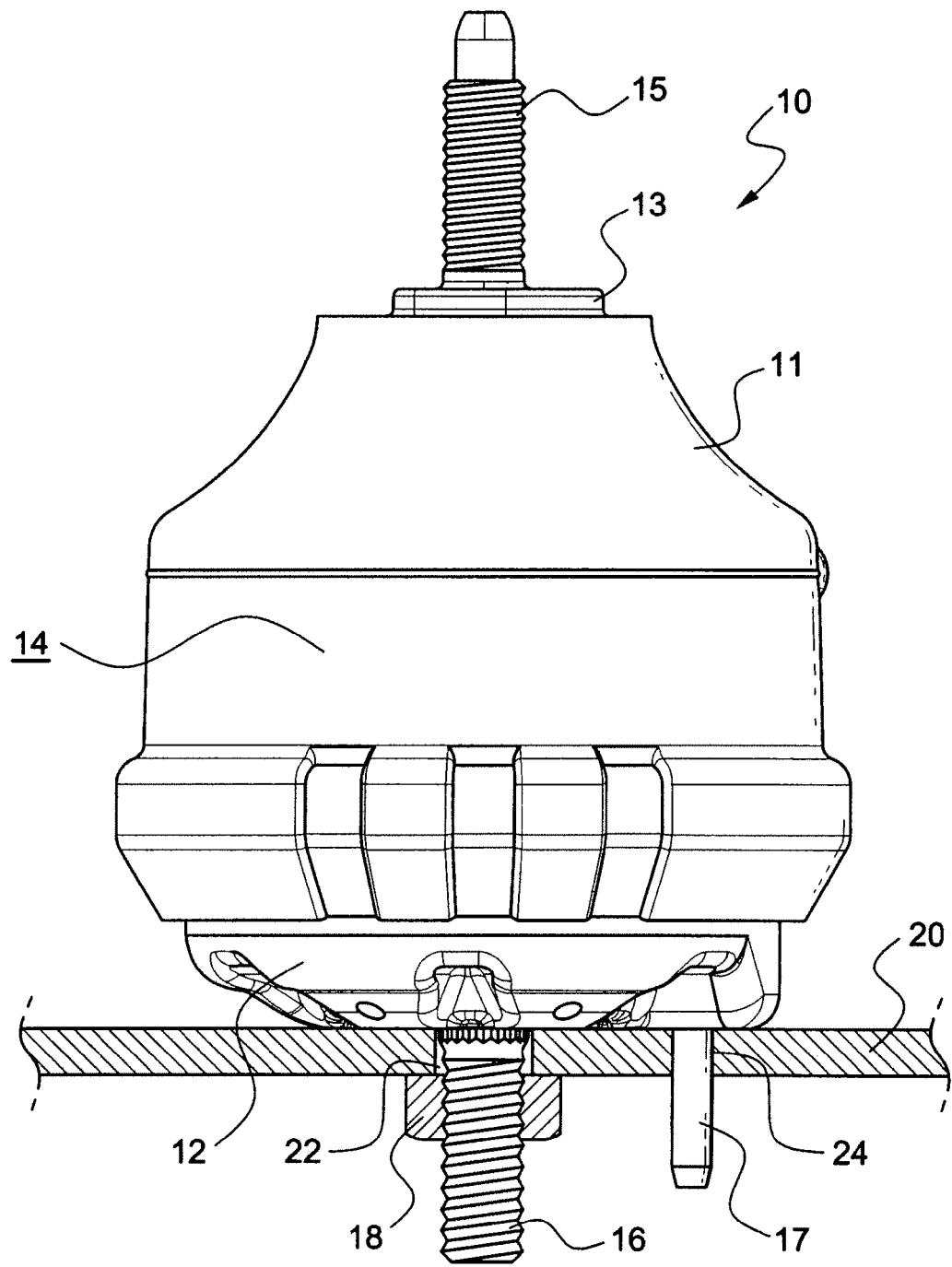
FIG. 1 shows a conventional hydraulic engine mount mounted on a vehicle frame.
Figure 4:
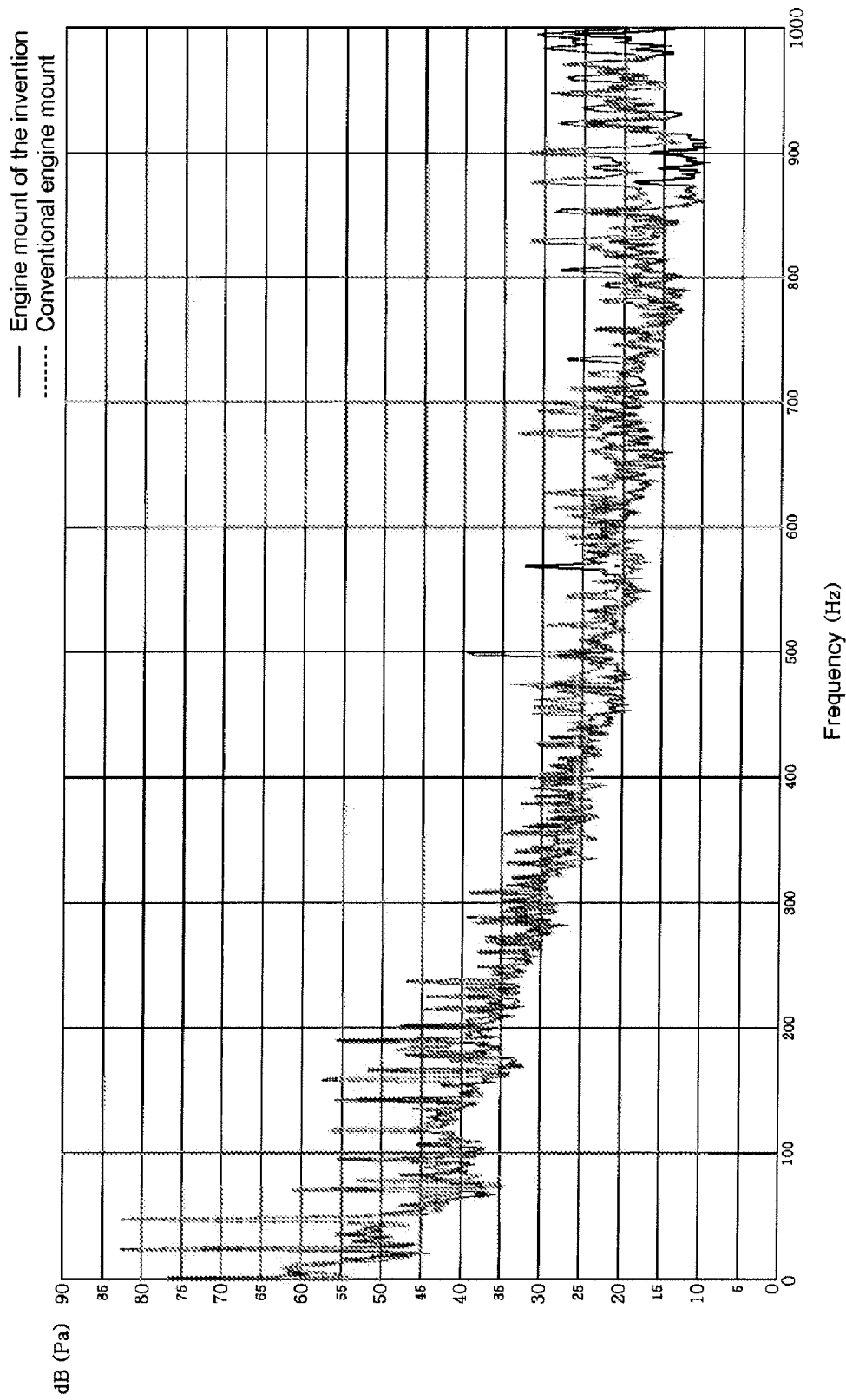
FIG. 4 is a graph showing noises heard to driver's ears under the same conditions when the conventional hydraulic engine mount of FIG. 1 and the hydraulic engine mount of the invention of FIG. 2 are installed in a vehicle frame respectively.

FIG. 4 is a graph showing noises heard to driver's ears under the same conditions when the conventional hydraulic engine mount of FIG. 1 and the hydraulic engine mount of the invention of FIG. 2 are installed in a vehicle frame respectively.

As can be seen from FIG. 4, at a frequency of below about 600 Hz, the vehicle noises have similar levels, on the whole, in both cases where the hydraulic engine mount of the invention and the conventional one are installed in the vehicle although it varies slightly with frequency ranges.

At a frequency of above about 600 Hz, however, the noises in case of the hydraulic engine mount of the invention has been found to be significantly low, as compared with the conventional hydraulic engine mount.

That is, the dual isolated hydraulic engine mount of the invention provides an improved performance of shielding or isolating high-frequency vibrations, as compared with conventional hydraulic engine mounts.

As described above, the hydraulic engine mount of the invention provides good vibration isolation effects at a high-frequency range to reduce noises inside of a vehicle, while maintaining advantages of conventional hydraulic engine mounts.

Accordingly, the hydraulic engine mount of the invention can provide isolation effects for high-frequency noises in vehicles having a high-power diesel engine.

In addition, the hydraulic engine mount of the invention can be easily applied regardless of types of engine mounts, without necessity of modifying the conventional hydraulic engine mounts.

While the present invention has been described with reference to the embodiments, the description is illustrative of the invention and is not to be construed as limiting the invention. Variations and modifications may occur to those skilled in the art, without departing from the spirit and scope of the invention, as defined by the appended claims.

What is claimed is:

1. A hydraulic engine mount having a fastener which is installed so as to protrude outside from a mount body and inserted into a fastener insert hole formed in a support structure and then fixed thereto by means of a fastener member, the engine mount comprising:
   a first elastic pad having a first hole through which the fastener can pass, the first elastic pad being disposed between the support structure and the mount body when installed in the support structure;
   a second elastic pad having a second hole through which the fastener can pass, the second elastic pad being disposed between the support structure and the fastener member when installed in the support structure, and
   a guide pin installed in the mount body in a way to be spaced apart from and in parallel with the fastener, the guide pin being inserted into a guide pin insert hole formed in the support structure to thereby prevent rotation of the mount body, and the first elastic pad further having a third hole formed through which the guide pin can pass.

2. The engine mount as claimed in claim 1, wherein the first elastic pad includes a tube member extended from around the third hole in same direction as the guide pin and surrounding the guide pin, the tube member being inserted into the guide pin insert hole to thereby prevent the guide pin from contacting directly the support structure.

3. The engine mount as claimed in claim 1, further comprising a compression restrictor member, which includes a flange disposed between the second elastic pad and the fastener member and having a fourth hole through which the fastener can pass, and a compression restrictor portion passing through the fastener insert hole from the flange around the fourth hole and extending towards the first elastic pad along outer circumferential face of the fastener, the compression restrictor portion being configured such that distance to the mount body can be adjusted depending upon compression level of the first and second elastic pad and, if the first and second elastic pads are compressed beyond a pre-determined level, the compression restrictor portion contacts the mount body to prevent the first and second elastic pads from being further compressed.

4. The engine mount as claimed in claim 1, wherein the first and second elastic pad is formed of rubber.

5. The engine mount as claimed in claim 1, wherein a step is formed along inner circumferential face of the second hole of the second elastic pad and towards the second elastic pad.

* * * * *